United States Patent [19]

Jovan et al.

[11] Patent Number: 5,930,886
[45] Date of Patent: Aug. 3, 1999

[54] METHOD OF VEHICLE SEAT ASSEMBLY

[75] Inventors: Dragi Jovan, Farmington Hills; David A. Bargiel, Troy; Thomas J. Susko, Eastpoint; Steven A. Schulte, Novi, all of Mich.

[73] Assignee: Chrysler Corporation, Auburn Hills, Mich.

[21] Appl. No.: 08/869,719

[22] Filed: Jun. 5, 1997

Related U.S. Application Data

[60] Continuation of application No. 08/471,804, Jun. 6, 1995, abandoned, which is a division of application No. 08/223,881, Apr. 6, 1994, Pat. No. 5,529,376.

[51] Int. Cl.⁶ .................................................. B23P 11/00
[52] U.S. Cl. ..................... 29/469; 29/525.02; 29/525.06; 29/525.11
[58] Field of Search .................................... 297/232, 233, 297/248, 250.1, 256.16, 257; 296/63, 64, 65.1, 69; 29/469, 525.02, 525.06, 525.11

[56] References Cited

U.S. PATENT DOCUMENTS

| | | |
|---|---|---|
| 808,679 | 1/1906 | Pickles . |
| 911,246 | 2/1909 | Kilburn . |
| 1,898,448 | 2/1933 | Hultgren ............... 297/233 X |
| 1,922,502 | 8/1933 | Scragg ................... 297/233 X |
| 1,998,186 | 4/1935 | Caesar et al. ............ 297/233 X |
| 2,035,451 | 3/1936 | Bell ....................... 297/233 X |
| 2,621,708 | 12/1952 | Luce, Jr. ................. 297/233 X |
| 3,193,326 | 7/1965 | Smith ......................... 297/257 |
| 4,657,302 | 4/1987 | Snyder ....................... 297/232 |
| 4,684,172 | 8/1987 | Lundquist ................... 297/248 |
| 4,759,580 | 7/1988 | Berklich, Jr. et al. ........ 296/65.1 |
| 5,104,065 | 4/1992 | Daharsh et al. ............. 296/64 X |

*Primary Examiner*—Joseph M. Gorski
*Attorney, Agent, or Firm*—Roland A. Fuller III

[57] ABSTRACT

A vehicle modular three-across seat, or, so-called, split bench seat assembly, including two wide outboard seat structures and a narrower middle seat structure. Each outboard seat structure is supported on the floor of the vehicle by four corner anchors for independent forward and aft movement. The middle seat is supported in a fixed manner by four corner support brackets extending outwardly and downwardly to mount on the adjacent two pairs of front and rear corner anchors. The modular three-seat assembly is adapted to be installed as a unit in the vehicle by securing the four corner anchors of each of the two outboard seat structures to the vehicle floor pan.

5 Claims, 6 Drawing Sheets

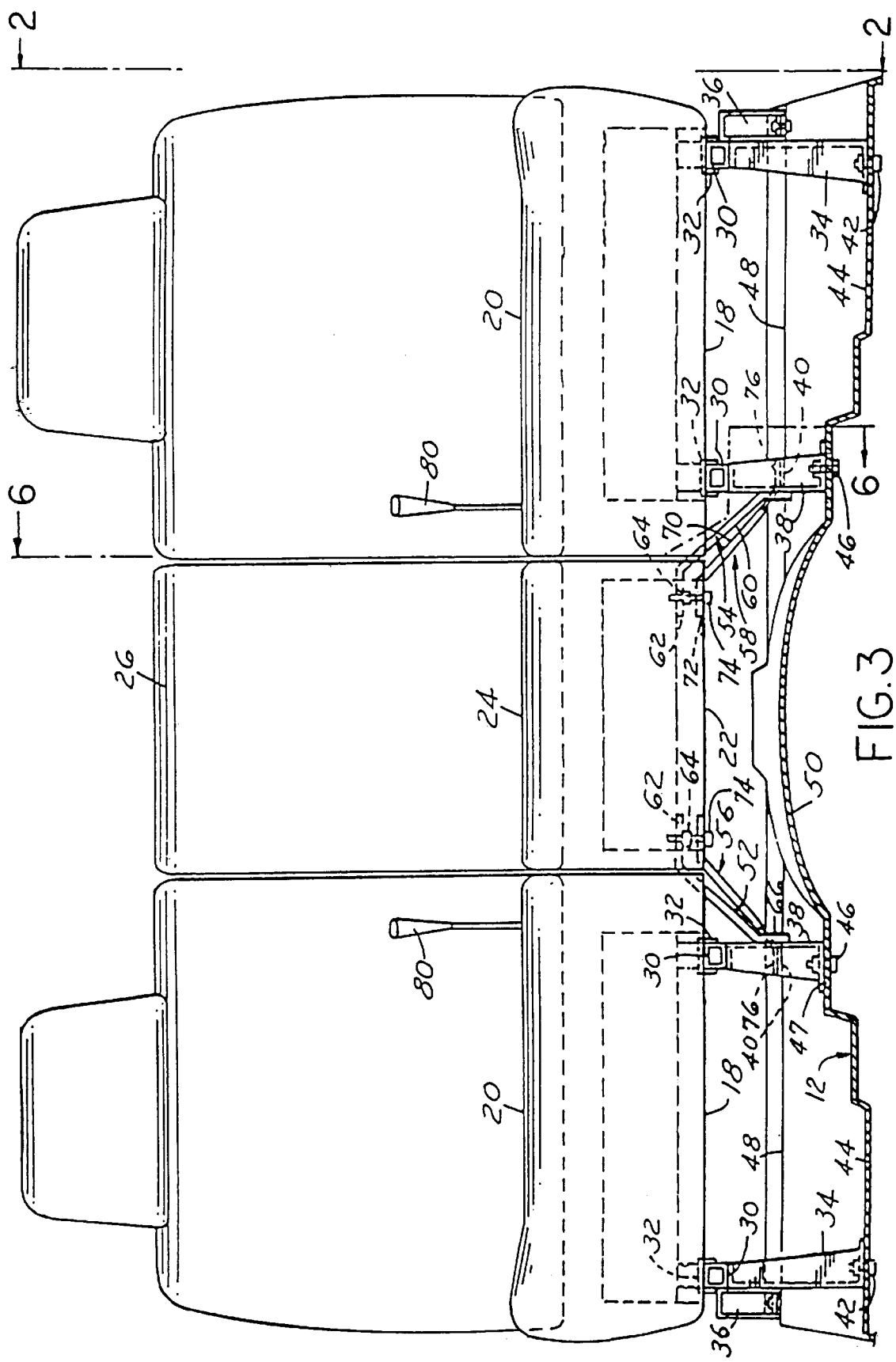

METHOD OF VEHICLE SEAT ASSEMBLY

CROSS-REFERENCE TO RELATED APPLICATION

This application is a File Wrapper Continuation of pending application Ser. No. 08/471,804, filed Jun. 6, 1995, now abandoned which is a division of application Ser. No. 08/223,881, filed on Apr. 6, 1994 and now U.S. Pat. No. 5,529,376.

FIELD OF THE INVENTION

This invention relates generally to vehicle seat assemblies and, more particularly, to a modular three-across seat assembly wherein fewer than normal floor anchors may be efficiently and safely used.

BACKGROUND ART

Heretofore, for a vehicle three-across seat arrangement, four corner anchors have been required for each of the three seat structures. For such seat structure arrangements, installation has generally involved installing the three seat structures individually into the vehicle, i.e., installing the middle seat structure first, followed by installing the two outer seat structures from opposite sides of the vehicle through associated side door frame openings.

DISCLOSURE OF THE INVENTION

A general object of the invention is to provide an improved three-across vehicle seat assembly.

Another object of the invention is to provide an improved modular three-across vehicle seat assembly.

A further object of the invention is to provide a modular three-across vehicle seat assembly wherein the outboard two seat structures are each adapted for support on the floor pan by an associated set of four corner anchors, and wherein the middle seat is supported in a piggyback manner on adjacent fore and aft inboard floor anchors of the two outboard seats, thus requiring a total of eight floor anchors for the middle.

Still another object of the invention is to provide a three-across vehicle seat assembly as set forth above which is assembled exterior of the vehicle, loaded into the vehicle through one side door frame opening thereof and mounted to the floor pan by eight anchors to two outboard and one central floor plates.

A still further object of the invention is to provide a modular three-across vehicle seat assembly, including two wide outboard seat structures and a narrower middle seat, wherein each outboard seat structure is adapted for support on four corner anchors for independent adjustable fore and aft movement, and the middle seat is fixedly supported by four corner support brackets extending outwardly and downwardly to mount on the adjacent two pairs of fore and aft floor pan corner anchors.

These and other objects and advantages will become more apparent when reference is made to the following drawings and the accompanying description.

BRIEF DESCRIPTION OF THE DRAWINGS

FIG. 3 is a front view of the seat assembly of FIGS. 1 and 2;

BEST MODE OF CARRYING OUT THE INVENTION

Figure 1:
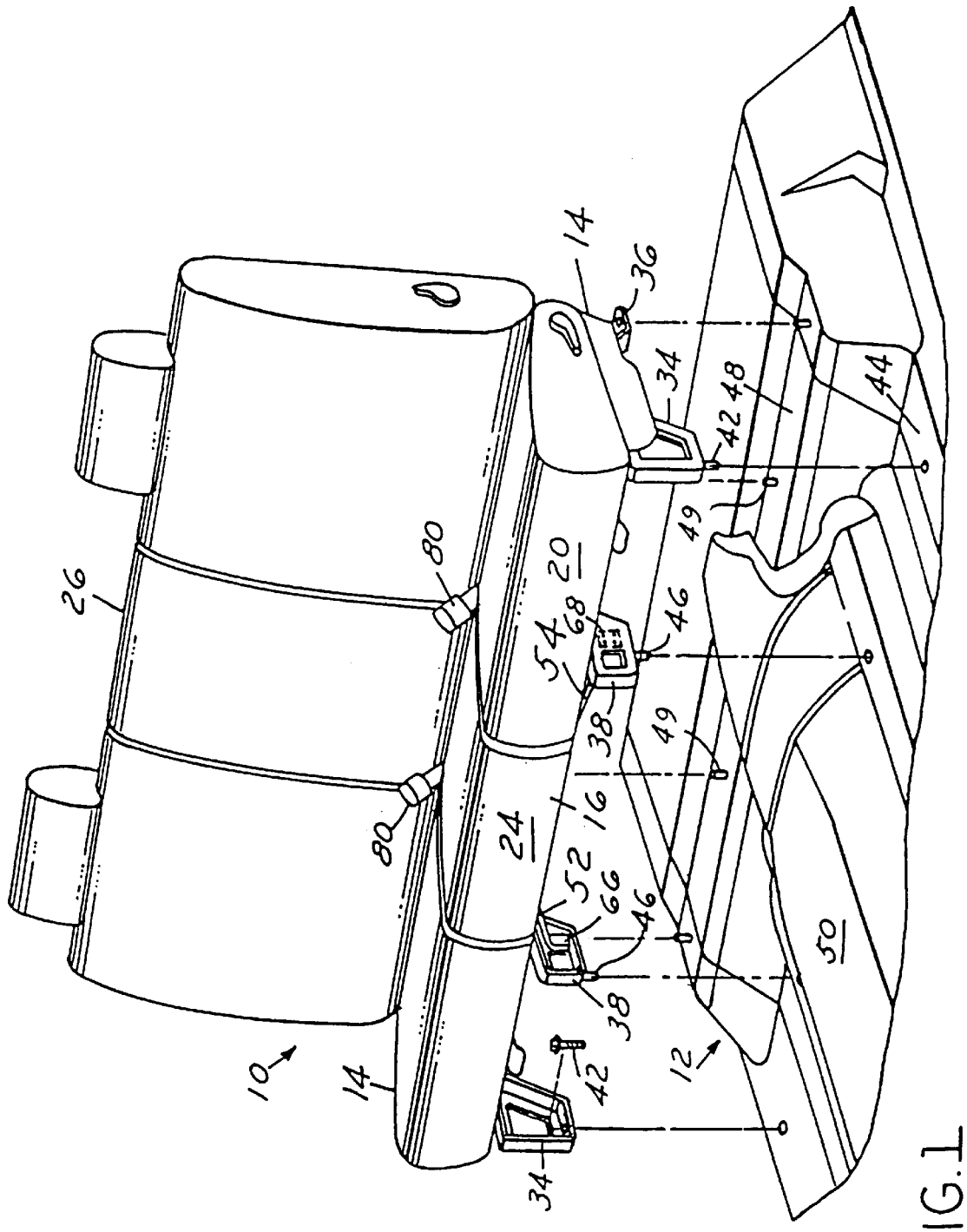
FIG. 1 is a perspective view of a vehicle seat assembly and floor pan embodying the invention.

Referring now to the drawings in greater detail, FIG. 1 illustrates a three-across vehicle seat or split bench seat assembly 10 considered to be particularly suitable for vehicles, such as the Dodge Ram Pickup. The assembly 10 is adapted to being mounted on a floor pan 12 by eight anchors, as will be explained. The seat assembly 10 is one complete unit comprising two wide outboard seat structure segments 14 and a narrow middle seat structure segment 16.

Figure 6:
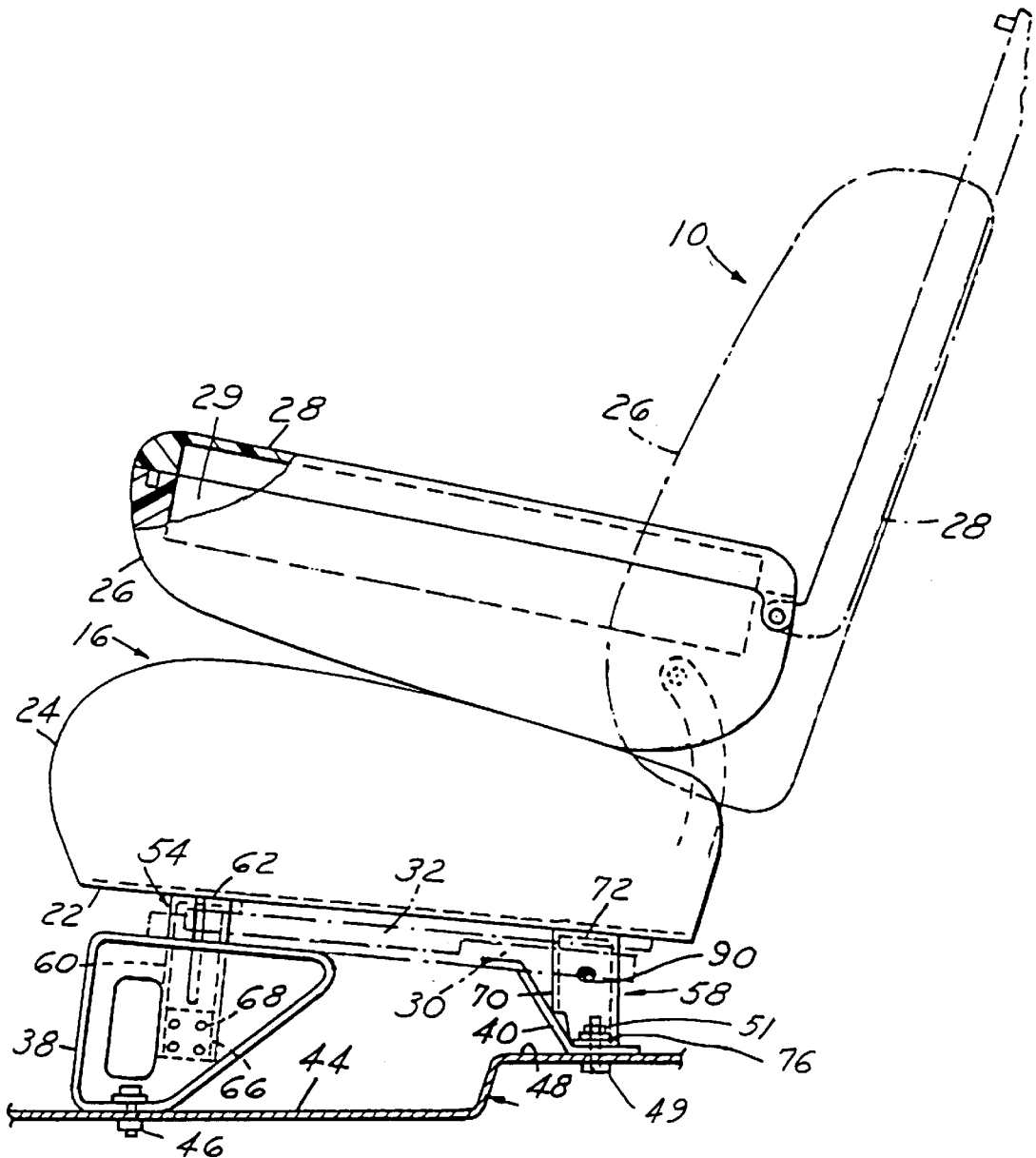
FIG. 6 is a cross-sectional view taken along the plane of the line 6—6 of FIG. 3, and looking in the direction of the arrows.

Each outboard segment 14 includes a seat frame 18 and a driver (left hand side) or passenger (right hand side) outboard seat 20. The narrow middle segment 16 comprises a seat frame 22 and a seat cushion portion 24. The latter seat cushion portion 24 includes a seat backrest 26 adapted to fold down about a transverse pivot axis onto the seat cushion 24 to serve as an armrest. In its folded-down position, the armrest/backrest 26 may be opened by lifting a cover 28 about a transverse hinge axis "A" (FIG. 6), exposing compartments, represented as 29, for such items as a personal computer, phone, and tapes.

Figure 2:
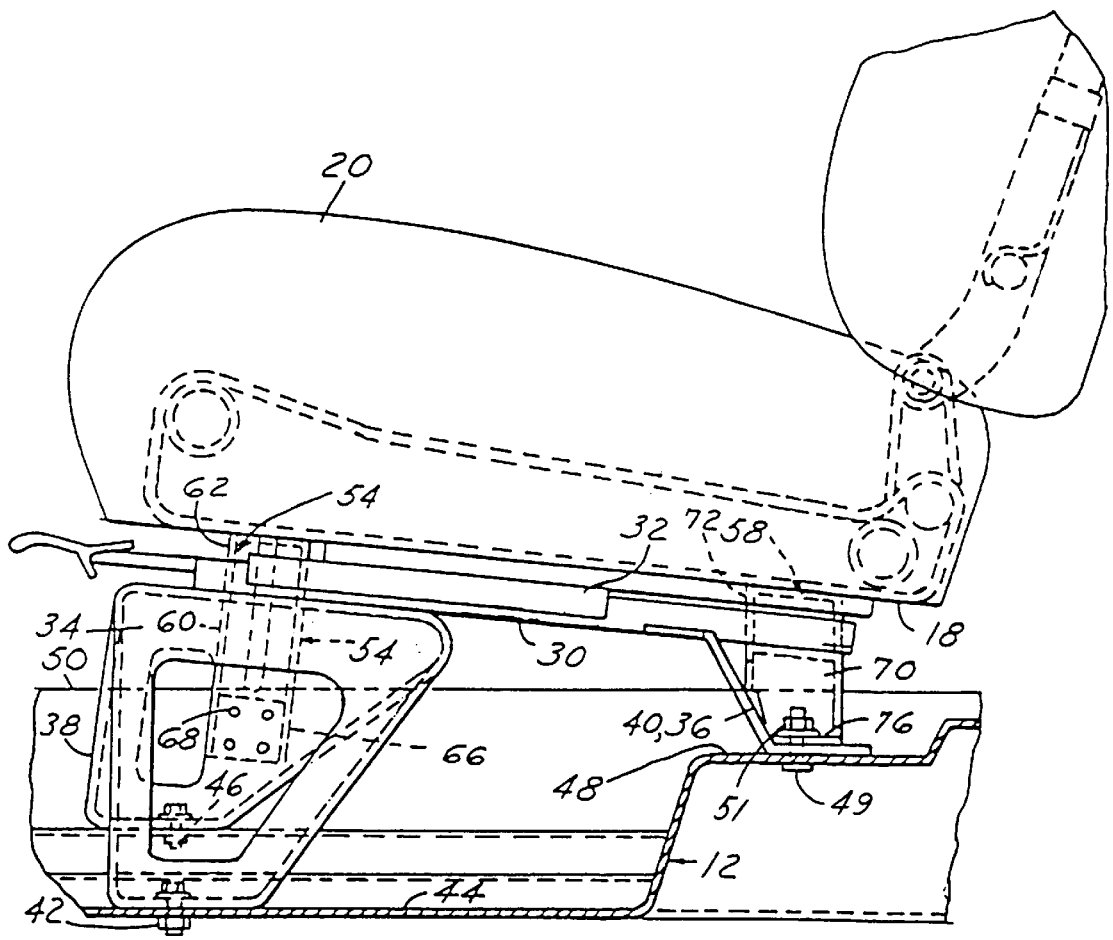
FIG. 2 is a side elevational view of the vehicle seat assembly embodying the invention.

Each frame 18 is slidably mounted on a pair of oppositely disposed fixed longitudinal tracks 30 by a pair of longitudinal slide members 32. Four corner anchors 34, 36, 38, 40 extend downwardly from the respective fore and aft ends of the fixed longitudinal tracks 30. The outboard front corner anchors 34 are each secured by screws 42 to a horizontal section 44 (FIGS. 1–3) of the floor pan 12. The inboard front corner anchors 38 are secured by screws 46 to horizontal sections 47. The four rear anchors 36 and 40 are secured by studs 49 (FIG. 2) and nuts 51 to oppositely disposed, outwardly extending floor pan flanges 48 (FIG. 1) adjacent a longitudinally extending, inverted U-shaped portion 50 of the floor pan 12. The latter portion 50 is mounted over the vehicle's drive train.

Figure 5:
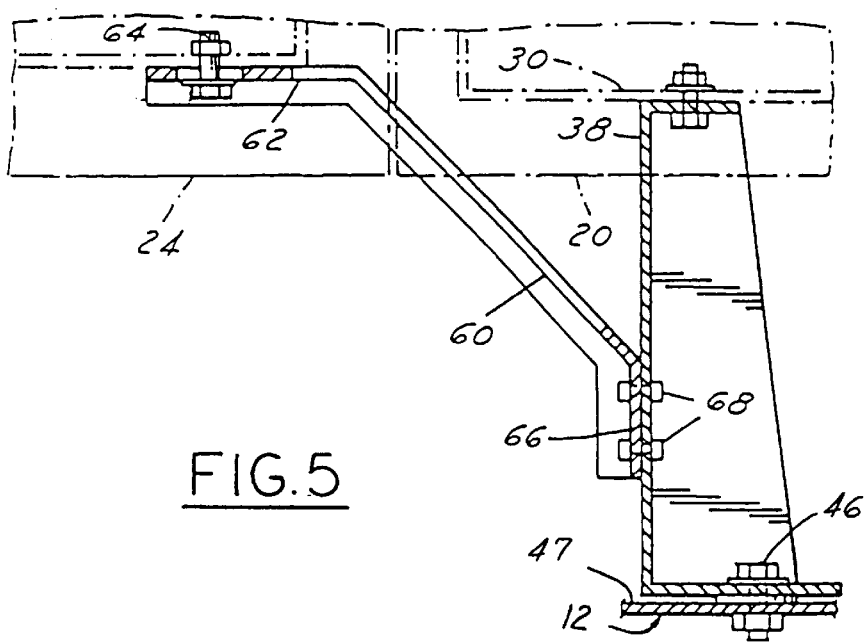
FIG. 5 is an enlarged cross-sectional view of one of two front support brackets embodied in the invention and taken along the plane of the line 5—5 of FIG. 4, and looking in the direction of the arrows.
Figure 4:
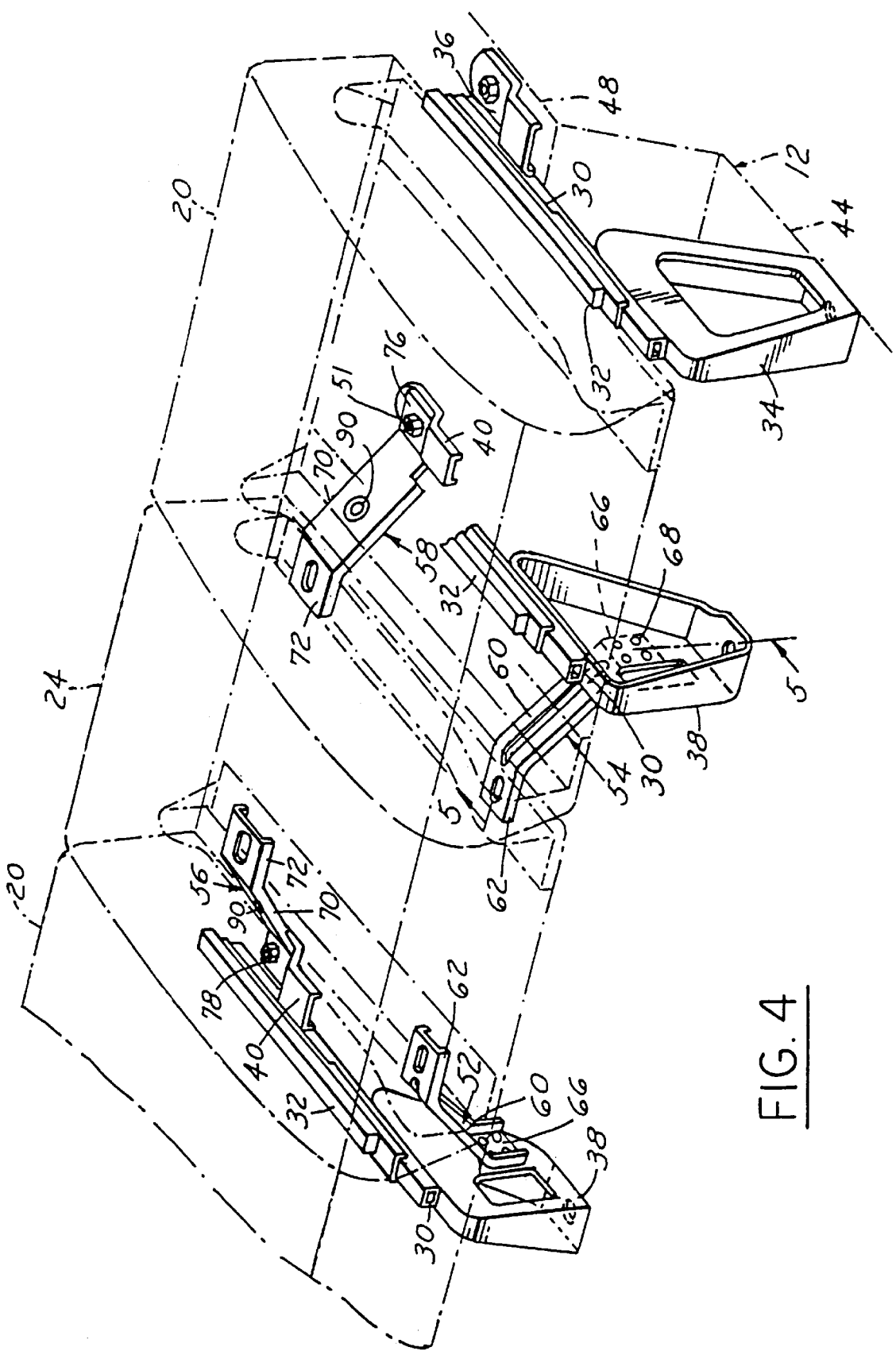
FIG. 4 is a perspective view illustrating the floor anchors, and associated support brackets of the invention.

The middle seat frame 22 has two front corner support brackets 52 and 54, and two aft corner support brackets 56 and 58. As shown in FIGS. 4 and 5, each front bracket 52 and 54 is formed to include a brace segment 60 angled outwardly and downwardly at a predetermined angle of the order of forty five degrees, a horizontal mounting flange 62 at the upper end thereof secured by a bolt 64 (FIGS. 3 and 5) to the front of the frame 22, and a vertical mounting flange 66 at the lower end thereof secured by a rivets 68 to a side of the adjacent corner anchor 38 extending from the frame 18.

As shown in FIG. 4, each aft support bracket 56 and 58 is also formed to include a brace segment 70 angled outwardly and downwardly at a predetermined angle, a horizontal mounting flange 72 at the upper end thereof secured by a bolt 74 (FIG. 3) to the rear of the middle seat frame 22, and a second horizontal mounting flange 76 at the lower end thereof secured by the nut 51 and the associated stud 49 (FIG. 2) to the anchor 40.

It will be noted that a pair of sub-assemblies are provided for the three-across seat assembly 10 by virtue of each aft bracket 56 and 58 being secured to its associated anchor 40 prior to being attached to the middle seat structure frame 22.

Figure 7:
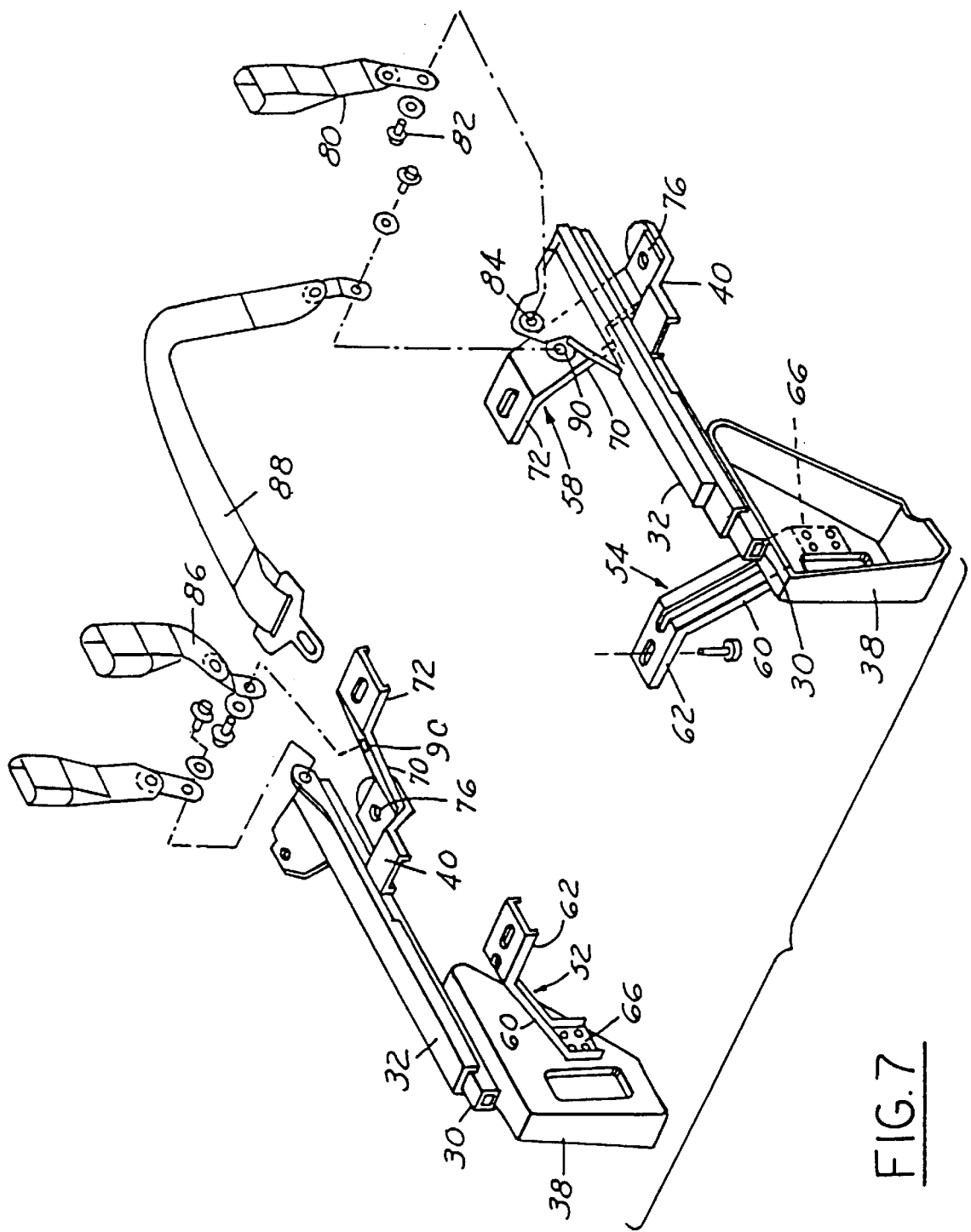
FIG. 7 is an exploded view showing the occupant restraint belt and front support brackets of the vehicle seat assembly.

As shown in FIG. 7, an occupant restraint belt connector 80 is mounted by fasteners 82 on a bracket 84 on a side of the rear corner of each longitudinal slide member 32, so as to be movable therewith. A seat belt bracket 86 and cooperating belt and tongue 88 for the middle seat segment 16 are attached by fasteners 90 through openings 92 (FIG. 4) to the center portions of the rear corner support brackets 56 and 58. Thus, the two conventional seat belt floor anchors are eliminated.

Constructed in the above described manner, for installation into the vehicle, the modular three-across seat assembly 10 is adapted for mounting as a unit. In one form the unit may be transported to the vehicle assembly line and inserted laterally by an automatic seat loader (not shown) through the driver's side door opening, and then secured to the respective floor pan segment 44 and U-shaped portion 50.

A conventional seat assembly, consisting of two wide outboard seat structures, i.e., the driver's and passenger's seat structures, and a narrower independent middle seat structure, are installed by first mounting the center independent seat by four floor anchors, and then mounting the two outboard seat structures from opposite sides of the vehicle, and securing each seat structure by four floor anchors, for a total of twelve anchors. As such, this is a time consuming method with a consequent cost and weight penalty.

Industrial Applicability

It should be apparent that a vehicle equipped with the eight seat anchor arrangement is adaptable to having a standard bench type seat assembly mounted therein.

While but one embodiment of the invention is shown and described, other modifications thereof are possible within the scope of the following claims.

What is claimed is:

1. A method of installing and mounting a split bench seat in a vehicle, comprising the steps of:

a. providing comprising two outer seat segments and an intermediate seat segment disposed between the two outer seat segments wherein the two outer seat segments each include floor anchors at four corners thereof;

b. attaching the intermediate seat segment directly, via brackets, to two of the floor anchors of each of the outer seat segments, thereby providing a three-segment split bench seat;

c. inserting the three-segment split bench seat as a unit laterally through one of the driver and passenger door openings of a vehicle;

d. seating the three-segment split bench on a floor pan of the vehicle; and e. securing the four floor anchors of each outer seat segment to the floor pan.

2. A method of installing and mounting a split bench type seat in a vehicle, comprising the steps of:

providing two outer seat structures each having four corners and a floor anchor at each of said corners;

providing an intermediate seat structure having four corners;

providing four brackets;

providing a vehicle body having two side door frame openings and a floor pan;

securing one end of each of one pair of the brackets to each of one pair of the four corners of said intermediate seat structure respectively, and securing a second end of each of said one pair of brackets directly to each of two of the floor anchors of one of said two outer seat structures, respectively, thereby interconnecting said intermediate seat structure to said one of said two outer seat structures;

securing one end of each of second pair of the brackets to each of a second pair of the four corners of said intermediate seat structure respectively, and securing a second end of each of said second pair of the brackets directly to each of two of the floor anchors of the other of said two outer seat structures, respectively, thereby interconnecting said intermediate seat structure to said other of said two outer seat structures, and thereby forming a unit consisting of said two outer seat structures separated by said intermediate seat structure;

inserting said unit laterally into said vehicle body through one of said door frame openings; then seating said unit on said floor pan; and then passing fasteners through each of said floor anchors and into said floor pan, thereby securing said unit to said floor pan within said vehicle body.

3. A method of installing and mounting a split bench type seat in a vehicle, comprising the steps of:

providing two outer seat structures each having four corners and a floor anchor at each of said corners;

providing an intermediate seat structure having four corners;

providing four brackets;

providing a vehicle body having right and left side door frame openings and a floor pan;

securing one end of each of one pair of the brackets to each of one pair of the four corners of said intermediate seat structure respectively, and securing a second end of each of said one pair of brackets directly to each of two of the floor anchors of one of said two outer seat structures, respectively, thereby interconnecting said intermediate seat structure to said one of said two outer seat structures;

securing one end of each of second pair of the brackets to each of a second pair of the four corners of said intermediate seat structure respectively, and securing a second end of each of said second pair of the brackets directly to each of two of the floor anchors of the other of said two outer seat structures, respectively, thereby interconnecting said intermediate seat structure to said other of said two outer seat structures, and thereby forming a unit consisting of said two outer seat structures separated by said intermediate seat structure;

inserting said unit laterally into said vehicle body through one of said right and left side door frame openings; then seating said unit on said floor pan; and then passing fasteners through each of said floor anchors and into said floor pan, thereby securing said unit to said floor pan within said vehicle body;

attaching a seat belt bracket to one of said brackets of said one pair; and attaching a seat belt at one end thereof to one of said brackets of said second pair and providing a tongue at the other end of the seat belt for cooperation with the seat belt bracket for use with the intermediate seat structure.

4. The method according to claim 3, wherein said inserting step includes inserting said unit laterally into said vehicle body through said left side door frame opening.

5. The method according to claim 3, wherein said inserting step includes inserting said unit laterally into said vehicle body through said right side door frame opening.

* * * * *